US009154729B2

(12) United States Patent
Ohmiya et al.

(10) Patent No.: US 9,154,729 B2
(45) Date of Patent: Oct. 6, 2015

(54) TELEVISION RECEIVING APPARATUS AND CONTROL METHOD FOR TELEVISION RECEIVING APPARATUS

(75) Inventors: Hiroyoshi Ohmiya, Osaka (JP); Takakazu Shiomi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 44 days.

(21) Appl. No.: 14/349,215

(22) PCT Filed: Dec. 28, 2011

(86) PCT No.: PCT/JP2011/007340
§ 371 (c)(1),
(2), (4) Date: Apr. 2, 2014

(87) PCT Pub. No.: WO2013/098896
PCT Pub. Date: Jul. 4, 2013

(65) Prior Publication Data
US 2014/0267556 A1    Sep. 18, 2014

(51) Int. Cl.
*H04N 7/14* (2006.01)
*G06F 13/00* (2006.01)
*H04H 60/80* (2008.01)
(Continued)

(52) U.S. Cl.
CPC ............... *H04N 7/147* (2013.01); *G06F 13/00* (2013.01); *H04H 60/80* (2013.01); *H04H 60/82* (2013.01); *H04N 7/15* (2013.01); *H04N 7/173* (2013.01); *H04N 21/4223* (2013.01); *H04N 21/42203* (2013.01); *H04N 21/42607* (2013.01); *H04N 21/4788* (2013.01); *H04N 21/4852* (2013.01)

(58) Field of Classification Search
USPC .......... 348/14.01, 14.04, 14.03, 14.07, 14.12, 348/14.13
See application file for complete search history.

(56) References Cited

U.S. PATENT DOCUMENTS 6,590,602 B1 *  7/2003  Fernandez et al. ......... 348/14.08
7,355,619 B2    4/2008  Motohashi
(Continued)

FOREIGN PATENT DOCUMENTS

JP    5-300511    11/1993
JP    8-307544    11/1996
(Continued)

OTHER PUBLICATIONS

International Search Report issued Jan. 31, 2012 in corresponding International Application No. PCT/JP2011/007340.

*Primary Examiner* — Olisa Anwah
(74) *Attorney, Agent, or Firm* — Wenderoth, Lind & Ponack, L.L.P.

(57) ABSTRACT

A television receiving apparatus includes: a transmitting unit which transmits, to a peer apparatus, first audio information received by a microphone and first video information captured by a camera; a receiving unit which receives, from the peer apparatus, second audio information and second video information; a telephone control unit which outputs the second audio information to a speaker; a display unit segmented into a first display area in which the first video information is displayed, a second display area in which the second video information is displayed, and a third display area; and a shared information control unit which causes shared information to be displayed in the third display area, and causes the transmitting unit to transmit the shared information so that the shared information is displayed by the peer apparatus.

9 Claims, 15 Drawing Sheets

(51) Int. Cl.
*H04H 60/82* (2008.01)
*H04N 7/15* (2006.01)
*H04N 7/173* (2011.01)
*H04N 21/422* (2011.01)
*H04N 21/4223* (2011.01)
*H04N 21/485* (2011.01)
*H04N 21/426* (2011.01)
*H04N 21/4788* (2011.01)

(56) References Cited

U.S. PATENT DOCUMENTS

| | | |
|---|---|---|
| 9,049,338 B2 * | 6/2015 | Witt et al. ............................. 1/1 |
| 2004/0145654 A1 | 7/2004 | Motohashi |
| 2005/0130613 A1 | 6/2005 | Kutsuna et al. |
| 2007/0107039 A1 | 5/2007 | Miyakawa et al. |
| 2007/0188594 A1 | 8/2007 | Yoshino |
| 2011/0109716 A1 * | 5/2011 | Choi ............................ 348/14.08 |
| 2012/0236109 A1 * | 9/2012 | Hsu ............................. 348/14.09 |

FOREIGN PATENT DOCUMENTS

| | | |
|---|---|---|
| JP | 2001-86475 | 3/2001 |
| JP | 2004-228805 | 8/2004 |
| JP | 2005-198257 | 7/2005 |
| JP | 2007-159098 | 6/2007 |
| JP | 2007-208458 | 8/2007 |
| WO | 03/077553 | 9/2003 |

* cited by examiner

FIG. 11

|     | 701  | 702       | 703       | 704  | 705              |
|-----|------|-----------|-----------|------|------------------|
| (1) | HEAD | SOURCE    | DST       | TYPE | PAYROAD          |
| (2) | HEAD | 10.1.9.16 | 10.10.2.5 | 1    | Photograph1.png  |
| (3) | HEAD | 10.1.9.16 | 10.10.2.5 | 2    | Mail.txt         |
| (4) | HEAD | 10.1.9.16 | 10.10.2.5 | 3    | 10               |
| (5) | HEAD | 10.1.9.16 | 10.10.2.5 | 4    | http://www.xyz.com |

TELEVISION RECEIVING APPARATUS AND CONTROL METHOD FOR TELEVISION RECEIVING APPARATUS

TECHNICAL FIELD

The present invention relates to television receiving apparatuses having a videophone function, and in particular to a television receiving apparatus having a function for information sharing between videophone users.

BACKGROUND ART

Nowadays, television receiving apparatuses having a videophone function such as Skype are being sold on the market. Videophones can realize smooth conversation because faces of users and background images are displayed which provide a larger amount of information compared to conversation by voice only. However, use of a videophone function provokes demands for sharing various kinds of information that the users have, on display screens of the videophones. Such demands are satisfied in an example disclosed in Patent Literature 1 etc.

FIG. 15 is a diagram of a system configuration of a "program selecting device" disclosed in Patent Literature 1. In FIG. 15, two television receivers 1910a and 1910b are connected to each other via the internet 1912. FIG. 15 also illustrates video cameras 1914a and 1914b each for self-capturing an image of a viewer, sub-screens 1916a and 1916b each for displaying captured video of a partner viewer, viewing screens 1918a and 1918b each for a received television broadcast program, and remote controllers 1922a and 1922b for each switching the television broadcast programs to be viewed by operating the television receivers 1910a and 1910b.

In the above configuration, for example, when a channel-up key or a channel-down key of the remote controller 1922a at the side of the television receiver 1910a is pressed, the channel-up or -down is notified from the television receiver 1910a to the television receiver 1910b at the partner side, allowing the two users to view the same program. In this way, the users can share the viewing television program on the display screens, and can make conversation with each other smoothly.

CITATION LIST

Patent Literature

[PTL 1]
Japanese Laid-open Patent Application Publication No. 2005-198257 (Page 1, FIG. 1, etc.)

SUMMARY OF INVENTION

Technical Problem

However, the technique disclosed in Patent Literature 1 merely allows sharing of a television program which is currently viewed, and does not allow the users to share various kinds of information which can be received by the television receivers 1910a and 1910b while making conversation by videophone.

The present invention was made in view of the above-described problem, with an aim to provide a television receiving apparatus which can realize more smooth conversation with a partner by videophone.

Solution to Problem

A television receiving apparatus according to an aspect of the present invention transmits and receives video information and audio information to and from a peer apparatus connected via a communication network. More specifically, the television receiving apparatus which transmits and receives video information and audio information to and from a peer apparatus connected via a communication network, and the television receiving apparatus includes: a transmitting unit configured to transmit, to the peer apparatus, first audio information received by a microphone connected to the television receiving apparatus and first video information captured by a camera connected to the television receiving apparatus; a receiving unit configured to receive, from the peer apparatus, second audio information received by a microphone connected to the peer apparatus and second video information captured by a camera connected to the peer apparatus; a telephone control unit configured to output the second audio information to a speaker connected to the television receiving apparatus; a display unit segmented into a first display area in which the first video information is displayed, a second display area in which the second video information is displayed, and a third display area; and a shared information control unit configured to cause shared information selected by a user of the television receiving apparatus to be displayed in the third display area, and cause the transmitting unit to transmit the shared information so that the shared information is displayed by the peer apparatus.

With this configuration, the users can not only simply browse the shared information simultaneously on their apparatuses, but also know responses (facial expressions, reactions, etc.) to the shared information. As a result, it is possible to make more smooth communications.

Furthermore, the receiving unit may further be configured to receive, from the peer apparatus, a command indicating details of processing that should be executed on the shared information. The television receiving apparatus may further include a command executing unit configured to execute processing indicated by the command on the shared information. In addition, the shared information control unit may be configured to cause the shared information subjected to the processing to be displayed in the third display area, and may cause the transmitting unit to transmit the shared information so that the shared information is displayed by the peer apparatus, the processing being indicated by the command and executed by the command executing unit.

With this configuration, it is possible to allow the peer apparatus to operate the own apparatus remotely. In this way, for example, in place for a user who is unfamiliar to operations of a television receiving apparatus, it is possible to operate the television receiving apparatus remotely from a peer apparatus located at a remote place. It is to be noted that the peer apparatus in this case may be an apparatus equivalent to the television receiving apparatus, or a terminal located at a call center or the like.

Furthermore, the receiving unit may further be configured to receive, from the peer apparatus, compatibility information indicating a format of the shared information which can be displayed. In addition, the shared information control unit may be configured to allow the user to select only the shared information having the format indicated by the compatibility information.

In this way, it is possible to prevent transmission of the shared information which is not supported by the peer apparatus.

Furthermore, the television receiving apparatus may further include: a tuner which receives a television program and electronic program information through a broadcast wave; and a shared information extracting unit configured to extract shared information candidates which are candidates for the shared information from the television program and the electronic program information received by the tuner. In addition, the shared information control unit may be configured to allow the user to select the shared information from among the shared information candidates extracted by the shared information extracting unit.

Specifically, the shared information may be location information indicating a location of actual data that should be displayed. In addition, the shared information control unit may be configured to cause the actual data obtained at the location indicated by the location information to be displayed in the third display area, and may cause the transmitting unit to transmit the location information so that the actual data is displayed by the peer apparatus.

Specifically, the location information may be either channel information indicating a source of a television program or a Uniform Resource Locator (URL) indicating the location on the Internet.

Furthermore, the receiving unit may further be configured to receive, from the peer apparatus, shared information displayed by the peer apparatus. Furthermore, the shared information control unit may further be configured to cause the shared information received by the receiving unit to be displayed in the third display area.

A television receiving apparatus according to an aspect of the present invention transmits and receives video information and audio information to and from a peer apparatus connected via a communication network. More specifically, the television receiving apparatus includes: a transmitting unit configured to transmit, to the peer apparatus, first audio information received by a microphone connected to the television receiving apparatus and first video information captured by a camera connected to the television receiving apparatus; a receiving unit configured to receive, from the peer apparatus, second audio information received by a microphone connected to the peer apparatus, second video information captured by a camera connected to the peer apparatus, and shared information displayed by the peer apparatus; a telephone control unit configured to output the second audio information to a speaker connected to the television receiving apparatus; and a display unit segmented into a first display area in which the first video information is displayed, a second display area in which the second video information is displayed, and a third display area in which the shared information is displayed.

Furthermore, the television receiving apparatus may further include a command generating unit configured to generate a command indicating details of processing that should be executed on the shared information displayed in the third display area. The transmitting unit may be configured to transmit, to the peer apparatus, the command generated by the command generating unit. The receiving unit may be configured to receive, from the peer apparatus, the shared information subjected to the processing indicated by the command transmitted from the transmitting unit. The display unit may be configured to display, in the third display area, the shared information subjected to the processing indicated by the command.

A method of controlling a television receiving apparatus according to an aspect of the present invention is a method of controlling a television receiving apparatus which transmits and receives video information and audio information to and from a peer apparatus connected via a communication network. More specifically, the method includes: transmitting, to the peer apparatus, first audio information received by a microphone connected to the television receiving apparatus and first video information captured by a camera connected to the television receiving apparatus; receiving, from the peer apparatus, second audio information received by a microphone connected to the peer apparatus and second video information captured by a camera connected to the peer apparatus; outputting the second audio information to a speaker connected to the television receiving apparatus; segmenting a display unit into a first display area in which the first video information is displayed, a second display area in which the second video information is displayed, and a third display area; and causing, in the segmenting, shared information selected by a user of the television receiving apparatus to be displayed in the third display area, and causing the shared information to be transmitted in the transmitting so that the shared information is displayed by the peer apparatus.

A method of controlling a television receiving apparatus according to an aspect of the present invention is a method of controlling a television receiving apparatus which transmits and receives video information and audio information to and from a peer apparatus connected via a communication network. More specifically, the method includes: transmitting, to the peer apparatus, first audio information received by a microphone connected to the television receiving apparatus and first video information captured by a camera connected to the television receiving apparatus; receiving, from the peer apparatus, second audio information received by a microphone connected to the peer apparatus, second video information captured by a camera connected to the peer apparatus, and shared information displayed by the peer apparatus; outputting the second audio information to a speaker connected to the television receiving apparatus; and segmenting a display unit into a first display area in which the first video information is displayed, a second display area in which the second video information is displayed, and a third display area in which the shared information is displayed.

Advantageous Effects of Invention

According to the present invention, it is possible to obtain a television receiving apparatus which can realize more smooth conversation with a partner by videophone.

BRIEF DESCRIPTION OF DRAWINGS

FIG. 11 is a diagram showing an example of a structure of a data to be transmitted and received between television receivers.

DESCRIPTION OF EMBODIMENTS

Embodiment 1

A television receiving apparatus according to Embodiment 1 of the present invention is described with reference to the drawings.

Figure 1A:
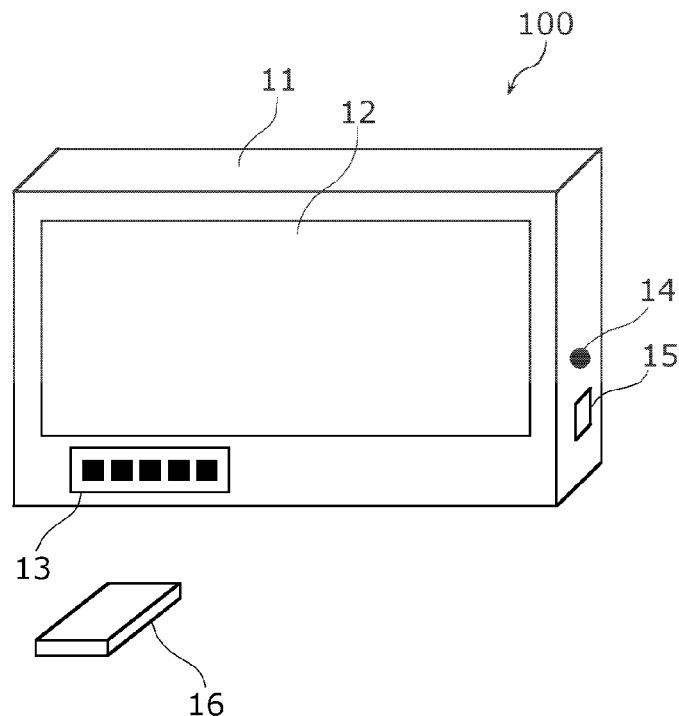
FIG. 1A is a diagram showing an example of an appearance of a television receiver according to Embodiment 1.

FIG. 1A is a diagram of an example of an appearance of the television receiver 100. The television receiver 100 includes a casing 11, a display unit 12, a front panel 13, an input terminal 14, and a network input terminal 15.

Here, as the display unit 12, it is possible to employ various kinds of display panels such as a cathode-ray tube, a plasma display, a liquid crystal display, an organic EL display, etc. In addition, the front panel 13 may include a signal receiver which receives a remote signal from a remote controller 16. Furthermore, to the input terminal 14, an antenna or a cable is connected which is for receiving video signals from a cable television station etc.

Figure 1B:
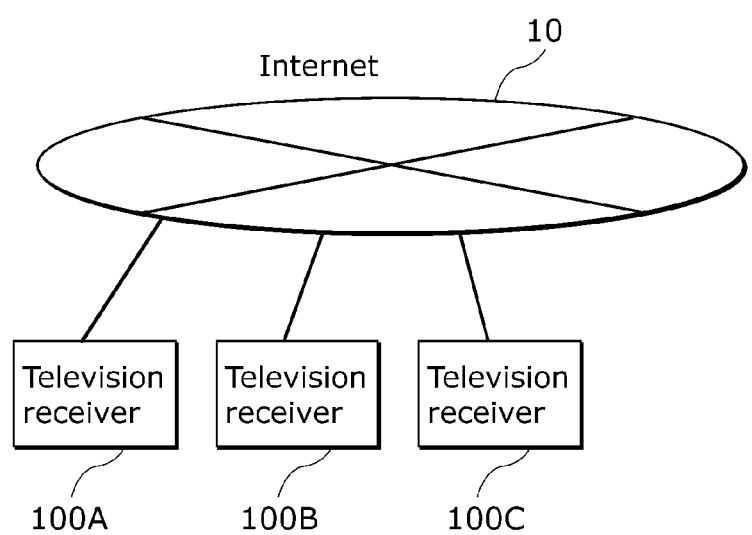
FIG. 1B is a diagram showing a state where a plurality of television receivers are connected to the Internet.

FIG. 1B is a schematic diagram showing a state in which a plurality of television receivers 100A, 100B, and 100C are connected to the Internet 10. The television receivers 100A, 100B, and 100C communicate with each other via the internet 10, and also communicate with an arbitrary server (not shown) on the Internet. The television receivers 100A, 100B, and 100C each have a function of the television receiver 100 in FIG. 2.

Figure 2:
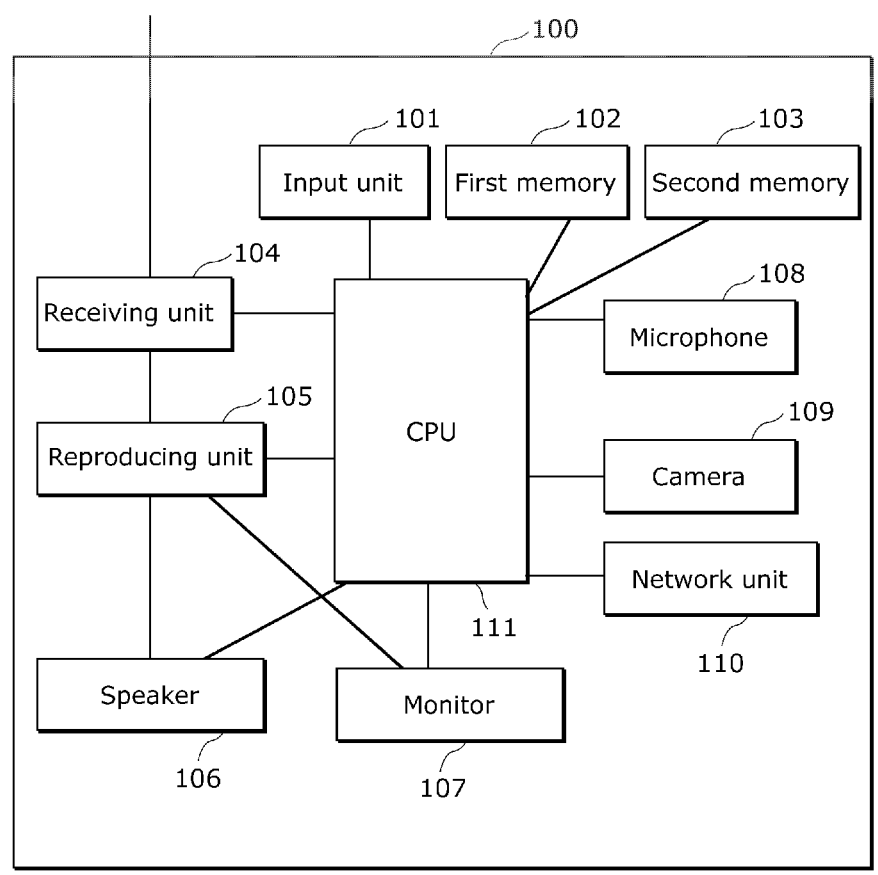
FIG. 2 is a functional block diagram of a television receiver according to Embodiment 1.

FIG. 2 is a block diagram showing relationships of structural elements of the television receiver (television receiving apparatus) 100. The television receiver 100 shown in FIG. 2 includes: an input unit 101 corresponding to the front panel 13 in FIG. 1A; a first memory 102; a second memory 103; a receiving unit 104 corresponding to the input terminal 14 in FIG. 1A; a reproducing unit 105; a speaker 106; a monitor 107 corresponding to the display unit 12; a microphone 108; a camera 109; a network unit 110 corresponding to the network input terminal 15 in FIG. 1A; and a CPU 111. The speaker 106, the microphone 108, and the camera 109 may be embedded in the television receiver 100, or may be an external device connected to the television receiver 100.

The input unit 101 is configured with a front panel, a signal receiver, etc., and receives a channel selection or an information input from a user. In addition, when the input unit 101 is a signal receiver, it receives an input from the remote controller, and thereby receives, for example, a user instruction for selecting a channel.

The first memory 102 is configured with a recording medium, such as a flash memory and a hard disc, which can store data without any power supply, and stores a program which is executed by the CPU 111. In addition, the first memory 102 temporarily stores or deletes data or a program which is directed by the CPU 111. The second memory 103 is specifically configured with a RAM or the like, temporarily stores or deletes data or a program which is directed by the CPU 111.

The receiving unit 104 is connected to the antenna or the cable from the cable television station, receives broadcast waves, performs tuning to a frequency specified by the CPU 111, and outputs, to the reproducing unit 105, broadcast waves extracted by the tuning.

The reproducing unit 105 extracts audio and video information from broadcast waves obtained from the receiving unit 104, based on the instruction from the CPU 111, and reproduces the audio and video information. Otherwise, the reproducing unit 105 extracts the audio and video information from an IP stream passed from the CPU 111, and reproduces the audio and video information. The speaker 106 outputs audio reproduced by the reproducing unit 105. The monitor 107 outputs video reproduced by the reproducing unit 105. The monitor 107 is segmented into a plurality of display areas, and can display a plurality of videos at the same time.

The microphone 108 receives an audio input such as a user voice, and passes it to the CPU 111. The camera 109 receives a video input such as a user face, and passes it to the CPU 111. The network unit 110 is specifically configured with an Ethernet (registered trademark) connector or the like, is connected to a network by control by the CPU 111, and realizes communication with devices connected to the network. The CPU 111 is a central processing unit which executes a program stored in the first memory 102 or the second memory 103.

Figure 3:
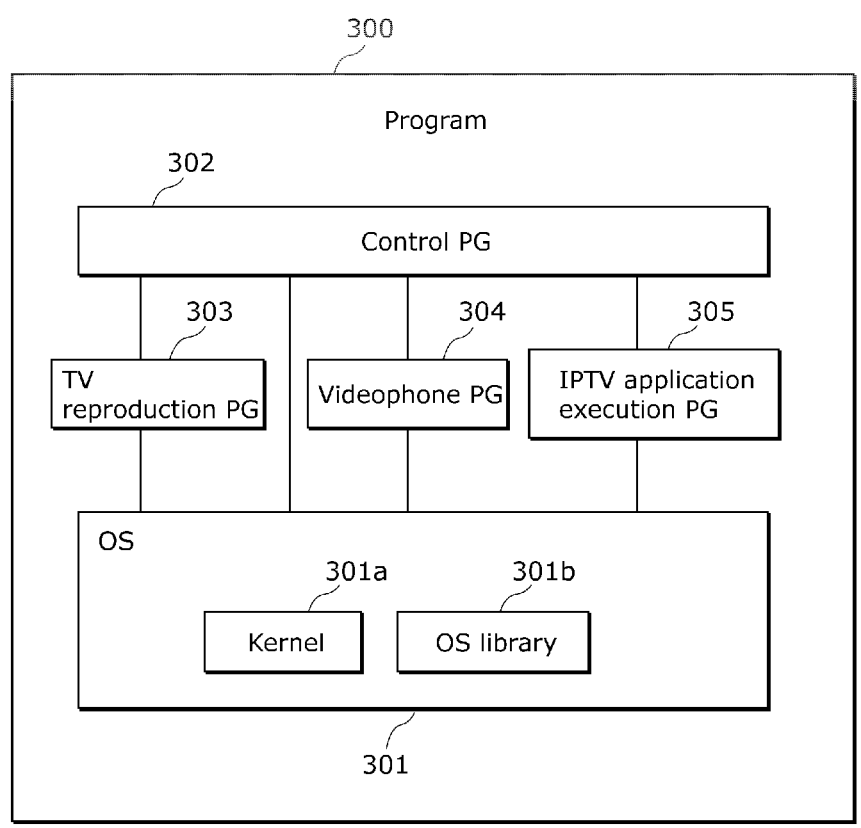
FIG. 3 is a diagram showing an example of a program which is executed by a CPU of a television receiver.

FIG. 3 is a diagram of an example of a program which is stored in the first memory 102 and is executed by the CPU 111. The program 300 is configured with a plurality of sub-programs, specifically, an OS 301, a control program (a "control PG" in FIG. 3) 302, a TV reproduction program (a "TV reproduction PG" in FIG. 3) 303, a videophone program (a "videophone program PG" in FIG. 3) 304, and an IPTV application execution program (an "IPTV application execution PG" in FIG. 3) 305.

The OS 301 is a sub-program which is activated by the CPU 111 when the television receiver 100 is turned on. Here, "OS" is an abbreviation of Operating System, and is, for example, Linux (registered trademark) or the like. The OS 301 is configured with a kernel 301a and an OS library 301b for executing the other sub-programs in parallel according to the conventional art, and thus it is not described in detail in the DESCRIPTIONS.

In this embodiment, the kernel 301a of the OS 301 executes a control program 302 as a sub-program. In addition, the OS library 301b provides sub-programs with a plurality of functions for controlling structural elements of the television receiver 100. The sub-programs are a control program 302, a TV reproduction program 303, and a videophone program 304. More specifically, the OS library 301b includes: a graphics library for displaying graphics such as characters and graphic symbols on the monitor 107; a tuning library for tuning to a frequency specified for the receiving unit 104; a microphone library for receiving an input voice or sound through the microphone 108; and a camera library for receiving an input video from the camera 109.

The control program 302 is a sub-program which is activated by the OS 301 when the television receiver 100 is turned on. The control program 302 receives an instruction from the user, and performs switch control between the TV reproduction program 303 and the videophone program 304.

The TV reproduction program 303 is for reproducing a TV program. The TV reproduction program 303 supports a known TV technique and is not a main structural element of the present invention. Thus, its functions are described briefly here. The TV reproduction program 303 receives a selection instruction indicating a program to be selected from the user through the input unit 101. Next, according to the selection instruction received through the input unit 101, the TV reproduction program 303 forwards a tuning instruction to the receiving unit 104, and forwards an instruction for reproducing video and audio to the reproducing unit 105. In this way, the receiving unit 104 performs tuning, the reproducing unit 105 reproduces the video and audio obtained from the receiving unit 104, the speaker 106 outputs the audio reproduced by the reproducing unit 105, and the monitor 107 outputs the video reproduced by the reproducing unit 105, and thereby the TV program is reproduced.

The videophone program 304 is for providing a videophone function, and is described in detail later.

The IPTV application execution program 305 is configured with Java (registered trademark) middleware, an HTML browser, a JavaScript (registered trademark) engine, and the like, reproduces internet content, and displays it on the monitor 107. This is a conventional technique, and thus no detailed description is provided here.

Figure 4:
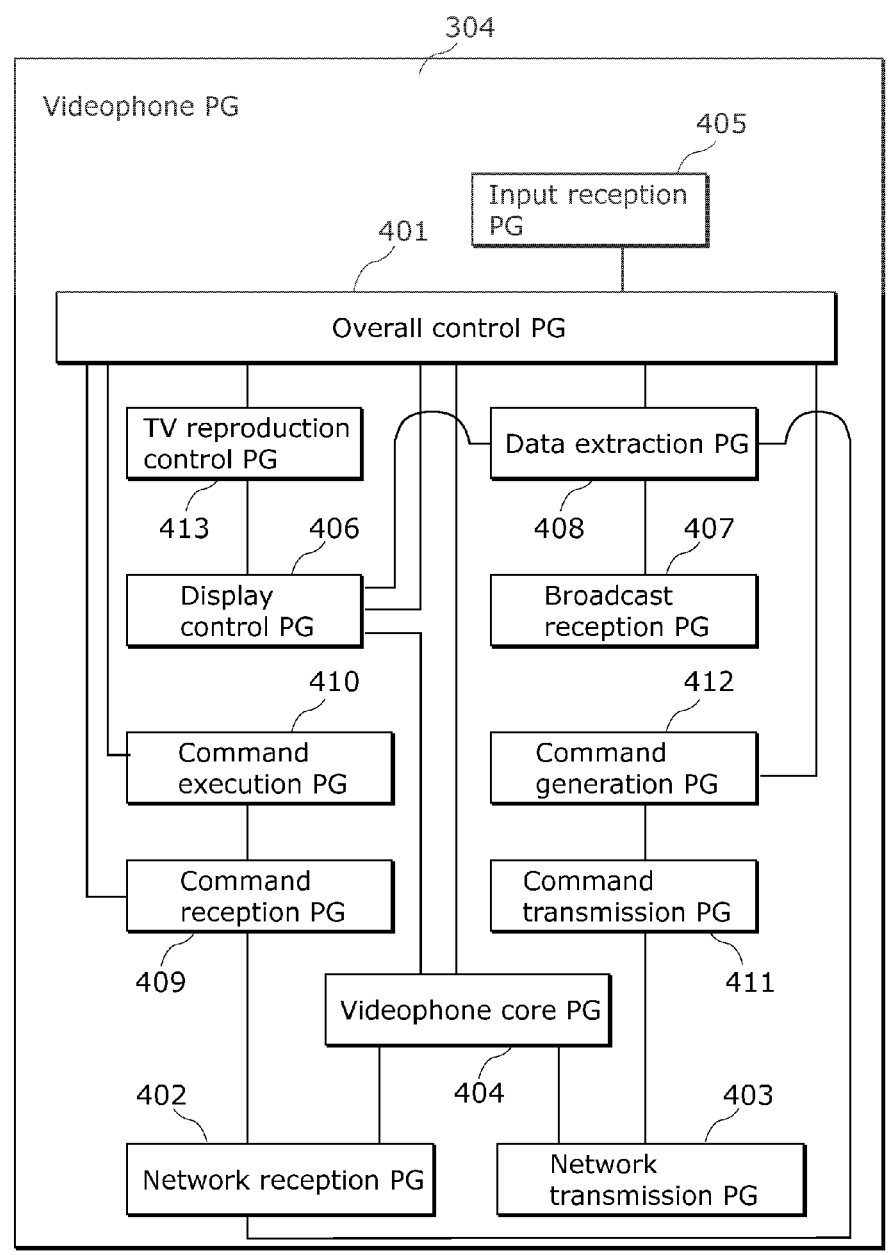
FIG. 4 is a diagram showing an example of a sub-program of a videophone program.

FIG. 4 is a diagram showing an example of a sub-program included in the videophone program 304. The videophone program 304 is configured with a plurality of sub-programs which are specifically: an overall control program (an "overall control PG" in FIG. 4) 401; a network reception program (a "network reception PG" in FIG. 4) 402; a network transmission program (a "network transmission PG" in FIG. 4) 403; a videophone core program (a "videophone core PG" in FIG. 4) 404; an input reception program (an "input reception PG" in FIG. 4) 405; a display control program (a "display control PG" in FIG. 4) 406; a broadcast reception program (a "broadcast reception PG" in FIG. 4) 407; a data execution program (a "data execution PG" in FIG. 4) 408; a command reception program (a "command reception PG" in FIG. 4) 409; a command execution program (a "command execution PG" in FIG. 4) 410; a command transmission program (a "command transmission PG" in FIG. 4) 411; a command generation program (a "command generation PG" in FIG. 4) 412; and a TV reproduction control program (a "TV reproduction control PG" in FIG. 4) 413.

The overall control program 401 is a sub-program which is executed firstly when the videophone program 304 is activated, and controls the other sub-programs included in the videophone program 304.

The network reception program 402 receives data from a network, using the OS library 301b in the OS 301 and the network unit 110, and passes the received data to the videophone core program 404 and the command reception program 409, according to the details of the received data.

The network transmission program 403 transmits the data to the network, using the OS library 301b in the OS 301 and the network unit 110. The transmitted data is data provided by the videophone core program 404 or the command transmission program 411.

Figure 5:
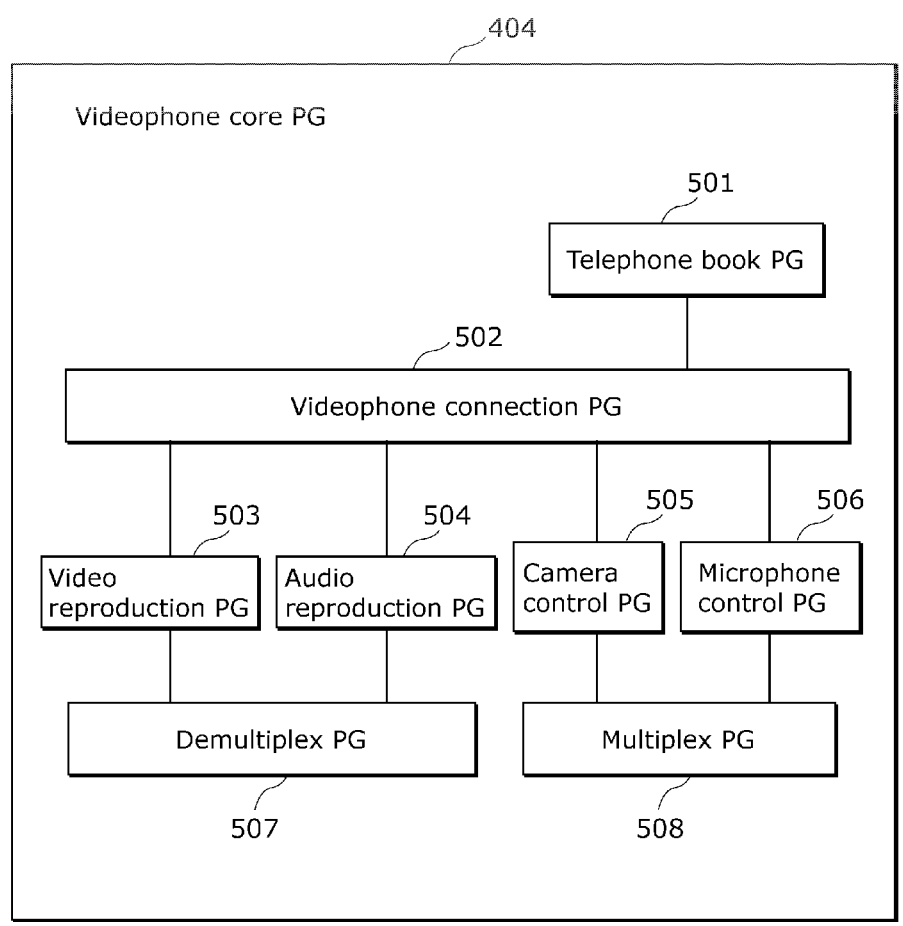
FIG. 5 is a diagram showing an example of a sub-program of a videophone core program.

The videophone core program 404 exerts a core function of the videophone program 304. FIG. 5 is a diagram showing an example of a sub-program included in the videophone core program 404.

The videophone core program 404 is configured with a plurality of sub-programs which are specifically: a telephone book program (a "telephone book PG" in FIG. 5) 501; a videophone connection program (a "videophone connection PG" in FIG. 5) 502; a video reproduction program (a "video reproduction PG" in FIG. 5) 503; an audio reproduction program (an "audio reproduction PG" in FIG. 5) 504; a camera control program (a "camera control PG" in FIG. 5) 505; a microphone control program (a "microphone control PG" in FIG. 5) 506; a demultiplex program (a "demultiplex PG" in FIG. 5) 507; and a multiplex program (a "multiplex PG" in FIG. 5) 508. The videophone core program 404 supports a conventional IP telephone technique, and thus its functions are described briefly here.

The telephone book program 501 stores information of a partner of videophone conversation. More specifically, the telephone book program 501 stores, in the first memory 102, the information (telephone book data) of the conversation partner through the OS library 301b in the OS 301. The telephone book data includes pairs of (i) the name of a conversation partner or index information corresponding to the name and (ii) a telephone number or information corresponding to the telephone number which is necessary for telephone connection.

When being activated by the overall control program 401, the videophone connection program 502 displays, on the monitor 107, a list of telephone book data stored in the telephone book program 501. In addition, the videophone connection program 502 receives a user input from the input unit 101 through the overall control program 401, and thereby selects information of the conversation partner from the telephone book data. Next, the videophone connection program 502 calls the conversation partner using the telephone number of the selected conversation partner or the information corresponding to the telephone number, and establishes a videophone connection. Subsequently, the videophone connection program 502 provides the video reproduction program 503, the audio reproduction program 504, the camera control program 505, and the microphone control program 506 with an instruction for transmitting and receiving video and audio necessary for videophone conversation.

The video reproduction program 503 receives the instruction from the videophone connection program 502, generates video from the video information received from the demultiplex program 507, and passes it to the display control program 406. The display control program 406 displays, on the monitor 107, the video data received from the video reproduction program 503 through the OS library 301b in the OS 301.

The audio reproduction program 504 receives the instruction from the videophone connection program 502, generates audio from the audio information received from the demultiplex program 507, and outputs the audio from the speaker 106 through the OS library 301b in the OS 301.

The camera control program 505 receives the instruction from the videophone connection program 502, receives and digitalizes the video from the camera 109 through the OS library 301b in the OS 301, and passes the digital video data to the multiplex program 508.

The microphone control program 506 receives the instruction from the videophone connection program 502, receives and digitalizes the audio from the microphone 108 through the OS library 301b in the OS 301, and passes the digital audio data to the multiplex program 508.

The demultiplex program 507 receives data which is required by the videophone core program 404 from the network reception program 402, and passes the data to the video reproduction program 503 and the audio reproduction program 504. The multiplex program 508 passes the data to the network transmission program 403, and requests for transmission to the partner of the videophone conversation.

The video reproduction program 503, the audio reproduction program 504, the camera control program 505, the microphone control program 506, the demultiplex program 507, and the multiplex program 508 operate in parallel while the videophone function is being executed, and thereby transmits and receives video and audio which are required to exert the videophone function.

The input reception program 405 receives input information from the input unit 101, specifically a remote controller of the television receiver, through the OS library 301b in the OS 301, and passes the received input information to the overall control program 401.

The display control program 406 displays, on the monitor 107, various kinds of video and data received through the OS library 301b in the OS 301, according to the instruction by the overall control program 401.

The broadcast reception program 407 receives a television program and an electric program information from a broadcast wave through the receiving unit 104. Alternatively, the broadcast reception program 407 may receive a television product and an electric program information from a server on the Internet through the network unit 110.

The data extraction program 408 extracts shared information from the data obtained from the display control program 406, the broadcast reception program 407, and the network reception program 402, according to the instruction by the overall control program 401.

The command reception program 409 performs filtering on the data obtained from the partner of the videophone conversation through the network reception program 402, according to the information given by the overall control program 401.

The command execution program 410 handles the data received from the conversation partner through the command reception program 409, according to the details of the data.

The command transmission program 411 transmits, to the conversation partner, the data generated by the command generation program 412 through the network transmission program 403.

The command generation program 412 generates the data to be transmitted to the partner of the videophone conversation, according to the instruction given by the overall control program 401. When the user makes a request, to the overall control program 401, that the user wants to transmit data to the partner of the videophone conversation to transmit, the overall control program 401 requests the command generation program 412 to generate the data to be transmitted. Here, the data obtained by the command reception program 409 or the data generated by the command generation program include, for example, shared information shared between the television receivers 100A and 100B or the command indicating the details of the processing that should be executed on the shared information.

In each of the program and sub-programs, for example, the network reception program 402 functions as a receiving unit which receives audio information received through a microphone connected to the peer apparatus, video information captured by a camera connected to the peer apparatus, and function information of the peer apparatus, from the conversation partner through the network unit 110.

In addition, for example, the network transmission program 403 functions as a transmitting unit which transmits the audio information received by the microphone 108 of the television receiver 100, the video information captured by the camera 109 of the television receiver 100, and the function information of the television receiver 100, from the conversation partner through the network unit 110.

In addition, for example, the videophone core program 404 functions as a telephone control unit which realizes a telephone function using audio information received by the network reception program 402 and audio information to be transmitted by the network transmission program 403.

In addition, for example, the display control program 406, the command reception program 409, the command execution program 410, the command transmission program 411, the command generation program 412 etc, function as a shared information control unit which causes the shared information selected by the user of the television receiver 100 to be displayed at a predetermined position on the monitor 107, causes the network transmission program 403 to transmit the shared information so that the shared information is displayed by the peer apparatus, and causes the shared information received by the network reception program 402 to be displayed at the predetermined position on the monitor 107.

In addition, for example, the data extraction program 408 functions as a shared information extracting unit which extracts shared information candidates for the shared information from the television program and electric program information obtained from the broadcast reception program 407.

In addition, for example, the command execution program 410 functions as a command execution unit which receives the command indicating the details of the processing that should be executed on the shared information from the conversation partner through the network reception program 402, and executes the processing indicated by the received command on the shared information. Furthermore, for example, the command generation program 412 functions as a command generation unit which generates the command indicating the details of the processing to be executed on the shared information.

It is to be noted that the above-described associations are mere non-limiting examples. In addition, FIG. 3 to FIG. 5 illustrate the non-limiting examples where the respective functional blocks are realized as the program or the sub-programs. However, the respective functional blocks may be realized as hardware such as an integrated circuit etc. or may be realized as a combination of hardware and software.

Figure 6:
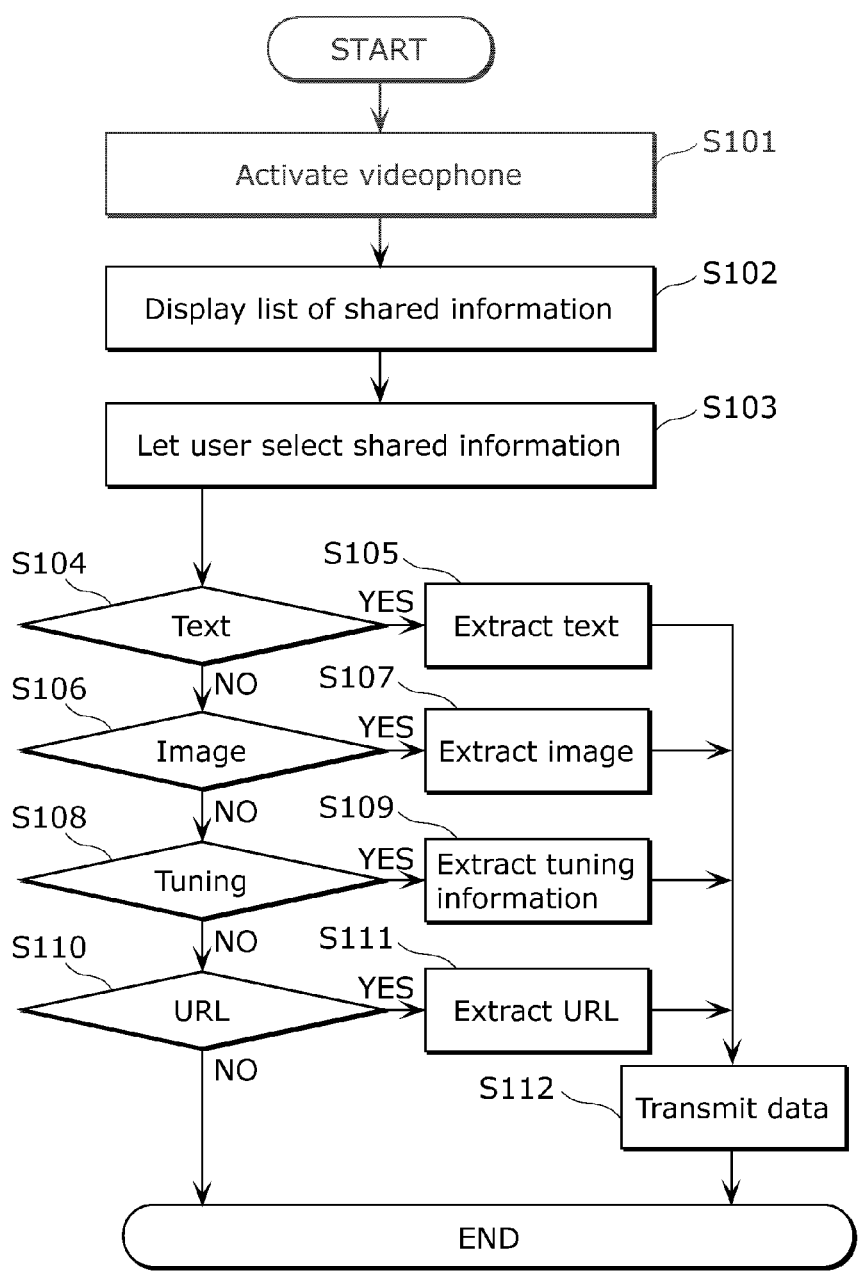
FIG. 6 is a flowchart showing an operation by a television receiver which is a transmission side of shared information.
Figure 7:
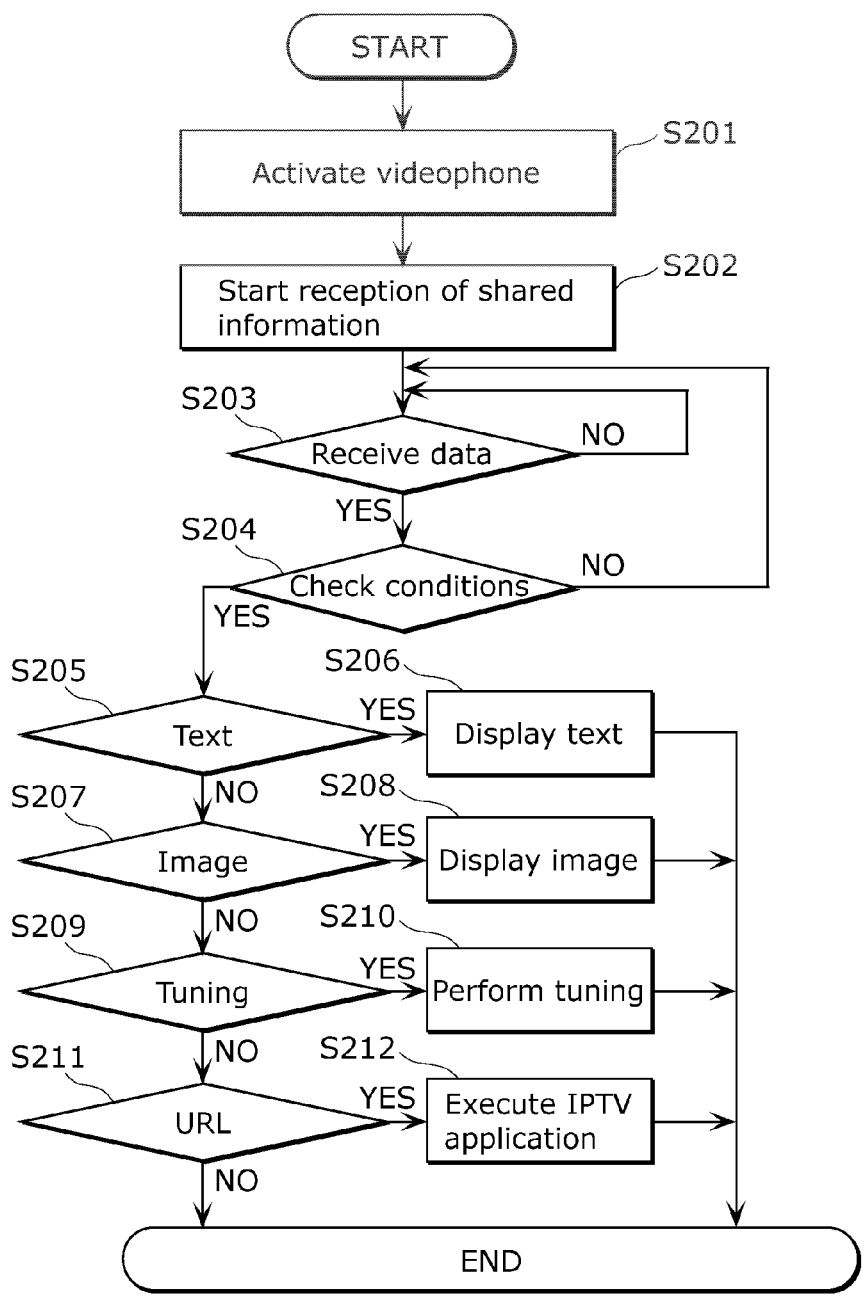
FIG. 7 is a flowchart showing an operation by a television receiver which is a reception side of shared information.
Figure 8:
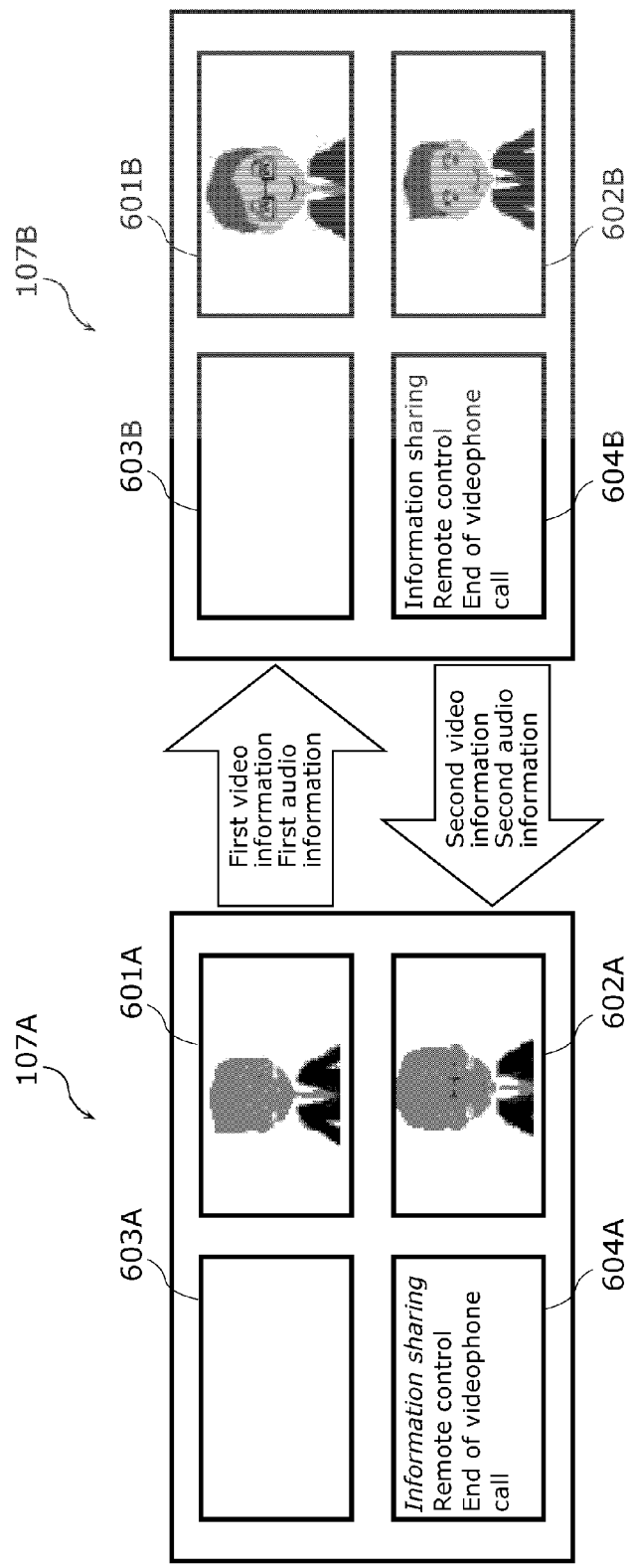
FIG. 8 is a diagram showing examples of display screens at the time when videophones connection is established.
Figure 9:
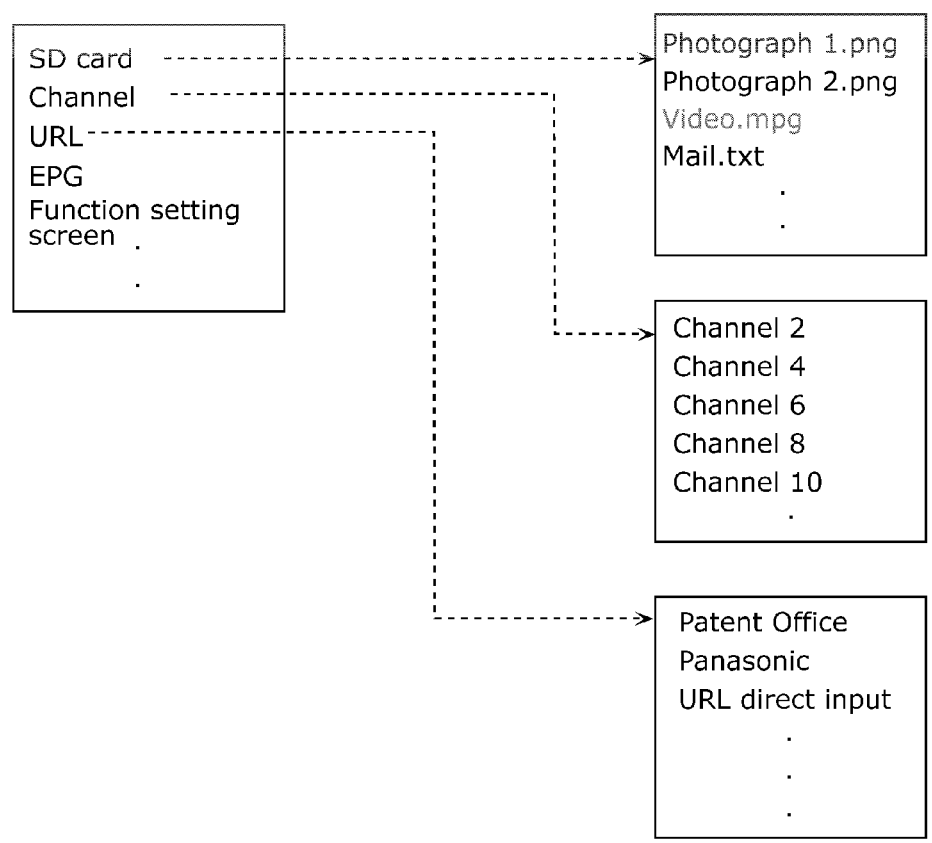
FIG. 9 is a diagram showing examples of transitions of display screens in a fourth display area.
Figure 10:
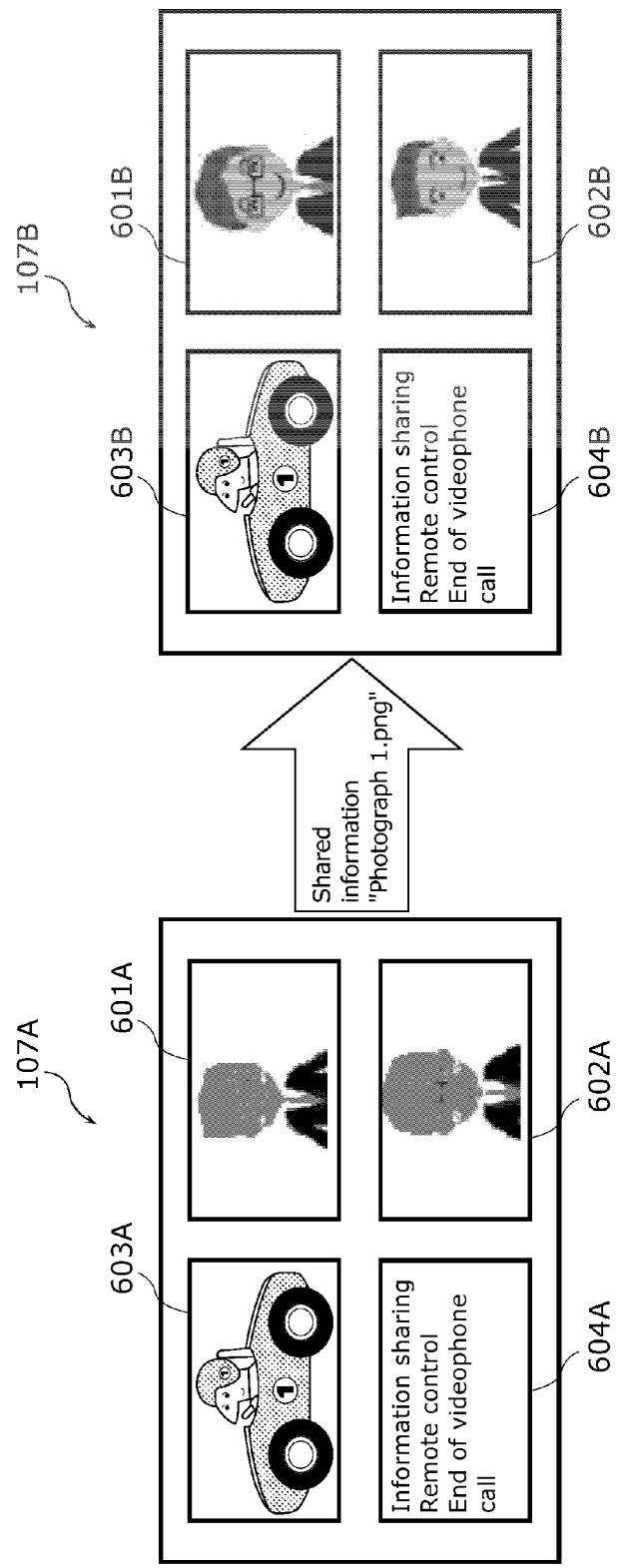
FIG. 10 is a diagram showing examples of display screens after shared information is transmitted.

With reference to FIG. 6 to FIG. 11, a description is given of processing for realizing a videophone function between the two television receivers 100A and 100B shown in FIG. 1B, and sharing information therebetween. FIG. 6 is a flowchart showing an operation by the television receiver 100A which is a transmission side of the shared information. FIG. 7 is a flowchart showing an operation by a television receiver B which is a reception side of the shared information. FIG. 8 to FIG. 10 are diagrams showing display examples on the monitors 107A and 107B. FIG. 11 is a diagram showing an example of a data structure of data to be transmitted from the television receiver 100A to the television receiver B.

As shown in FIG. 6 and FIG. 7, each of the television receivers 100A and 100B activates a videophone function (S101 in FIG. 6, and S201 in FIG. 7). In other words, the videophone connection program 502 of the television receivers 100A and 100B establishes a videophone connection between the television receivers 100A and 100B.

As shown in FIG. 8, the videophone core program 404 of the television receiver 100A transmits, to the television receiver 100B through the network transmission program 403, first audio information (typically, a voice of a user of the television receiver 100A) obtained from the microphone 108 connected to the television receiver 100A, and first video information (typically, the face of the user of the television receiver 100A) obtained from the camera 109 connected to the television receiver 100A.

In addition, the videophone core program 404 of the television receiver 100A may transmit compatibility information of the television receiver 100A to the television receiver 100E through the network unit 110. The compatibility information is information indicating a format of shared information which can be displayed by the television receiver 100A. For example, compatibility information corresponds to information identifying a format (an extender) of a file which can be displayed, information of a resolution of the monitor 107A of the television receiver 100A, etc.

Likewise, as shown in FIG. 8, the videophone core program 404 of the television receiver 100B transmits, to the television receiver 100A through the network transmission program 403, second audio information (typically, a voice of a user of the television receiver 100B) obtained from the microphone 108 connected to the television receiver 100B, and second video information (typically, the face of the user of the television receiver 100B) obtained from the camera 109 connected to the television receiver 100B.

As shown in FIG. 8, on the monitor 107A of the television receiver 100A, the first video information, the second video information, and a menu are displayed in a first display area 601A, a second display area 602A, and a fourth display area 604A, respectively. On the other hand, at this point, nothing is displayed in a third display area 603A. In addition, the speaker 106 of the television receiver 100A outputs the second audio information (not shown).

Likewise, on the monitor 107B of the television receiver 100B, the second video information, the first video information, and a menu are displayed in a first display area 601B, a second display area 602B, and a fourth display area 604B, respectively. On the other hand, at this point, nothing is displayed on a third display area 603B. In addition, the speaker 106 of the television receiver 100E outputs the first audio information (not shown).

In other words, the user of the television receiver 100A can communicate while watching both user's face and partner's face. In addition, the user of the television receiver 100A can select a desired function from the menu ("Information sharing", "Remote operation", and "End of videophone call" in the example of FIG. 8) displayed in the fourth display area 604B. This is true of the user of the television receiver 100B.

Hereinafter, a description is given of processing by the television receivers 100A and 100B assuming that the user of the television receiver 100A selects "Information sharing" as shown in FIG. 8. When the user of the television receiver 100A selects "Information sharing", the overall control program 401 of the television receiver 100A displays a list of shared information in the fourth display area 604A on the monitor 107A through the display control program 406 (S102). FIG. 9 is a diagram showing examples of transitions in the fourth display area 604A of the display screen in the case where "Information sharing" is selected.

First, as shown in the left-side display example in FIG. 9, a menu for selecting a source of the shared information is displayed in the fourth display area 604A. In the example of FIG. 9, "SD card", "Channel", "URL", "EPG", and "Function setting screen" are displayed as candidates for the source of the shared information. These candidates for the source of the shared information are non-limiting examples.

When "SD card" is selected as shown in the display example at the upper row at the right side in FIG. 9, a transition is made to a screen of a list of files stored in an SD card. Here, based on the compatibility information of the obtained television receiver 100B, the files having a format which can be displayed by the television receiver 100B are displayed in a selectable state (in black font), and a file which cannot be displayed by the television receiver 100B is displayed in an unselectable state (in gray font). More specifically, FIG. 9 shows the display example where an image file (.png) and a text file (.txt) can be displayed by the television receiver 100B, and a video file (.mpg) cannot be displayed by the television receiver 100B.

When "Channel" is selected as shown in the display example at the middle row at the right side in FIG. 9, a transition is made to a screen of a list of channels from which signals can be received by the receiving unit 104. When "URL" is selected as shown in the display example at the lower row at the right side in FIG. 9, a transition is made to a screen including a list of URL ("Patent office" and "Panasonic" in the example of FIG. 9) registered as favorites in the television receiver 100A and a menu for directly inputting a URL.

When "EPG" is selected, text data is extracted from an EPG obtained through the receiving unit 104. When "EPG" is selected, it is only necessary for the data extraction program 408 to extract, for example, the name of a television program, broadcast time, the names of casts, the details of the program, etc. At this time, it is also good to use a technique for extracting keywords from text using a known technique, for example, a syntax analysis or a morpheme analysis.

Furthermore, when "Function setting screen" is selected, image data of the function setting screen of the television receiver 100A is extracted. This is described in detail in Embodiment 2.

Here, shared information to be extracted is not limited to the above examples. For example, information of an IPTV service, the name of an application, the URL of the application which is currently being executed may be extracted, or image data (snapshot) may be extracted from a television program which is currently being received.

Next, the television receiver 100A allows the user to select shared information (S103). More specifically, the input reception program 405 of the television receiver 100A receives a signal from a remote controller or the like operated by the user through the input unit 101, Next, the command generation program 412 of the television receiver 100A determines the kind of the selected shared information (S104, S106, S108, and S110).

When the selected shared information is "Text" (YES in S104), the command generation program 412 of the television receiver 100A extracts, for example, "Mail.txt" stored in the SD card (S105). In addition, when the selected shared information is "Image" (YES in S106), the command generation program 412 of the television receiver 100A extracts, for example, "Photograph 1.png" stored in the SD card (S107).

On the other hand, when the selected shared information is "Tuning" (YES in S108), the command generation program 412 of the television receiver 100A extracts selected tuning information (for example "Channel 10") (S109). In addition, when the selected shared information is "URL" (YES in S110), the command generation program 412 of the television receiver 100A extracts the selected URL (for example, "http://www.xyz.com") (S111).

Next, the command transmission program 411 of the television receiver 100A transmits the data extracted in Step S105, Step S107, Step S109, or Step S111 to the television receiver 100B through the network transmission program 403 (S112). In addition, the overall control program 401 of the television receiver 100A displays the data extracted in Step S105, Step S107, Step S109, or Step S111 on a third display area 603A on the monitor 107A through the display control program 406. More specifically, the display control program 406 generates image data of the extracted data using an image drawing function of the OS library 301b of the OS 301, and displays the generated image data on the monitor 107A.

With reference to FIG. 11, a description is given of an example of a structure of data to be transmitted in Step S112.

First, (1) in FIG. 11 shows a basic format. First, an identifier for identifying data to be transmitted and received by videophone is set at a HEAD 701. In addition, an identifier for identifying a source (that is, the television receiver 100A) is set at a SOURCE 702. In addition, an identifier for identifying a destination (that is, the television receiver 100B) is set at a DST 703. In addition, an identifier for identifying a type of the transmitted data is set at a TYPE 704. In addition, shared information is set in a PAYLOAD 705.

More specifically, an IP address, a MAC address, etc. for identifying the television receivers 100A and 100B are stored at the SOURCE 702 and DST 703. Possible examples of values to be set at the TYPE 704 include "1" for Image data, "2" for Text data, "3" for Channel, and "4" for URL.

In FIG. 11, (2) shows an example where image data (photograph 1.png) is set in the PAYLOAD 705. In FIG. 11, (3) shows an example where text data (Mail.txt) is set in the PAYLOAD 705. In FIG. 11, (4) shows an example where tuning information (Channel 10) is set in the PAYLOAD 705. In FIG. 11, (5) shows an example where a URL (http://www.xyz.com) is set in the PAYLOAD 705.

On the other hand, the command reception program 409 of the television receiver 100B starts receiving shared information from the television receiver 100A through the network reception program 402 (S202). Next, when the network reception program 402 receives data (YES in S203), the command reception program 409 checks whether or not the received data is a format shown in FIG. 11 (S204). For example, the command reception program 409 may check the conditions below.

For example, when an instruction for processing only data transmitted from a specific television receiver (for example, the television receiver 100A) is received from the overall control program 401, the command reception program 409 may check whether or not the identifier of the specific television receiver is set at the SOURCE 702. On the other hand, when an instruction for processing data transmitted from all television receivers is received from the overall control program 401, the command reception program 409 may skip checking the SOURCE 702.

Alternatively, when an instruction for processing only data unicast to the television receiver 100B is received from the overall control program 401, the command reception program 409 may check whether or not the identifier of the television receiver 100B is set at the DST 703. Alternatively, when an instruction for processing broadcast data is received from the overall control program 401, the command reception program 409 may skip checking the DST 703.

Furthermore, the command reception program 409 may check whether or not the shared information can be displayed by the television receiver 100B, based on the value set at the TYPE 704. For example, when the television receiver 100B does not process image data, data having "1" at the TYPE 704 is filtered.

When the received data satisfies all the conditions (YES in S204), the command reception program 409 passes the received data to the command execution program 410. The command execution program 410 checks the value set at the TYPE 704 of the received data (S205, S207, S209, and S211).

When the shared information is text (YES in S205), the command execution program 410 requests the overall control program 401 to display the text data (Mail.txt) set at the PAYLOAD 705. The overall control program 401 displays the details of the "Mail.txt" in the third display area 603B on the monitor 107B through the display control program 406 (S206).

When the shared information is an image (YES in S207), the command execution program 410 requests the overall control program 401 to display the image data (photograph 1.png) of the image data set at the PAYLOAD 705. The overall control program 401 displays the details of the "photograph 1.png" in the third display area 603B of the monitor 107B through the display control program 406 (S208).

In FIG. 11, (2) and (3) are examples where the raw shared information (actual data) is set in the data to be transmitted from the television receiver 100A to the television receiver 100B. In other words, the overall control program 401 of the television receiver 100B that obtained the data indicated in (2) and (3) of FIG. 11 displays the shared information included in the obtained data in the third display area 603B on the monitor 107B.

In addition, when the shared information is tuning information (YES in S209), the command execution program 410 notifies the overall control program 401 of the tuning information (Channel 10) set at the PAYLOAD 705. The overall control program 401 receives a program at the "Channel 10" using a TV reproduction function of the OS library 301b of the OS 301, and displays the program in the third display area 603B on the monitor 107B through the display control program 406 (S210).

When the shared information is URL (YES in S211), the command execution program 410 notifies the overall control program 401 of the URL (http://www.xyz.com) set at the PAYLOAD 705. The overall control program 401 obtains content shown at the URL through the IPTV application execution program 305, displays the content in the third display area 603B on the monitor 107B through the display control program 406 (S212).

In FIG. 11, (4) and (5) are examples where location information indicating a location of actual data that should be displayed is set, instead of raw shared information, in the data to be transmitted from the television receiver 100A to the television receiver 100B. In other words, the overall control program 401 of the television receiver 100B that obtained the data indicated in (4) and (5) of FIG. 11 obtains the actual data using the location information included in the obtained data, and displays the obtained actual data in the third display area 603B on the monitor 107B.

FIG. 10 is a diagram showing display examples when the "Photograph 1.png" that is an example of the shared information is displayed on the monitors 107A and 107B of the television receivers 100A and 100B. As shown in FIG. 10, on the monitor 107A of the television receiver 100A, the face (of the user of the television receiver 100A), the face (of the user of the television receiver 100B), and the shared information are displayed in the first display area 601A, the second display area 602A, and the third display area 603A, respectively. Likewise, on the monitor 107B of the television receiver 100B, the face (of the user of the television receiver 100B), the face (of the user of the television receiver 100A), and the shared information are displayed in the first display area 601B, the second display area 602B, and the third display area 603B, respectively.

In this way, the user's face (in the first display area), the partner's face (in the second display area), and the shared information (third display area) are displayed at the same time on each of the display screens. Thus, the users of the television receivers 100A and 100B can not simply browse the shared information at the same time but know the partner's response (facial expressions, reactions, etc) to the shared information. As a result, it is possible to make smooth communication, compared to the case where the shared information is displayed on the entire screen.

Embodiment 2

Figure 12:
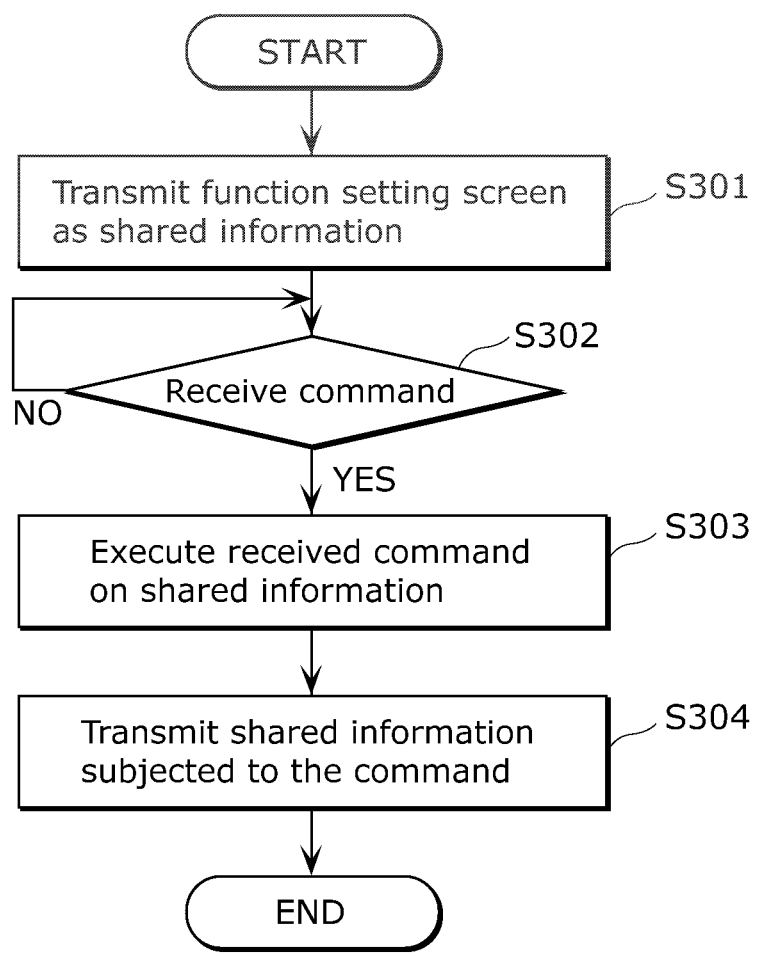
FIG. 12 is a flowchart showing operations by a television receiver subjected to a remote operation (an operated side).
Figure 13:
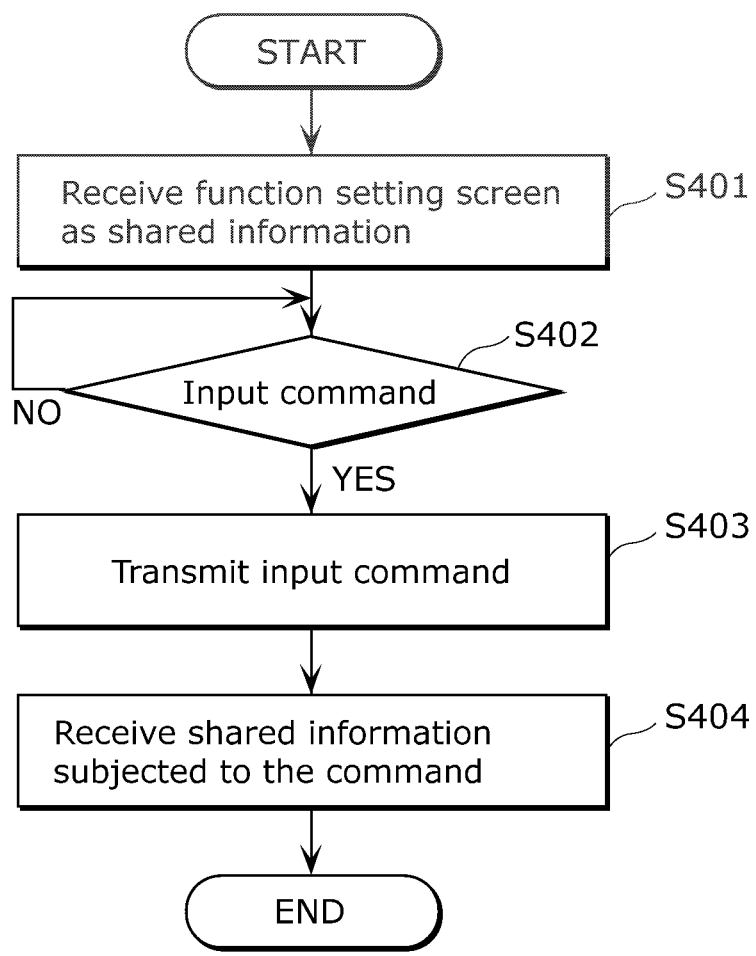
FIG. 13 is a flowchart showing operations by a television receiver which performs a remote operation (an operating side).
Figure 14:
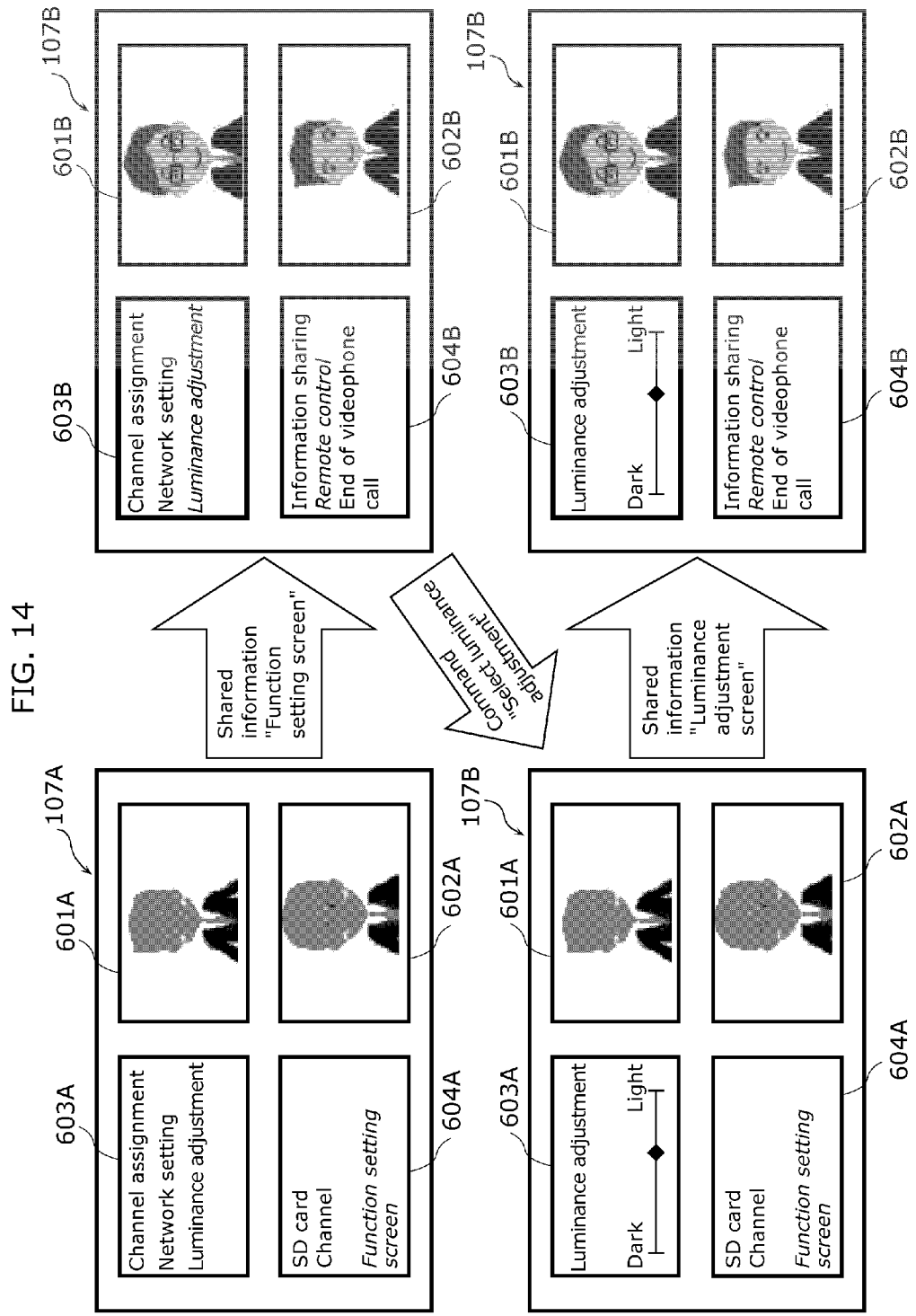
FIG. 14 is a diagram showing examples of display screens in Embodiment 2.
Figure 15:
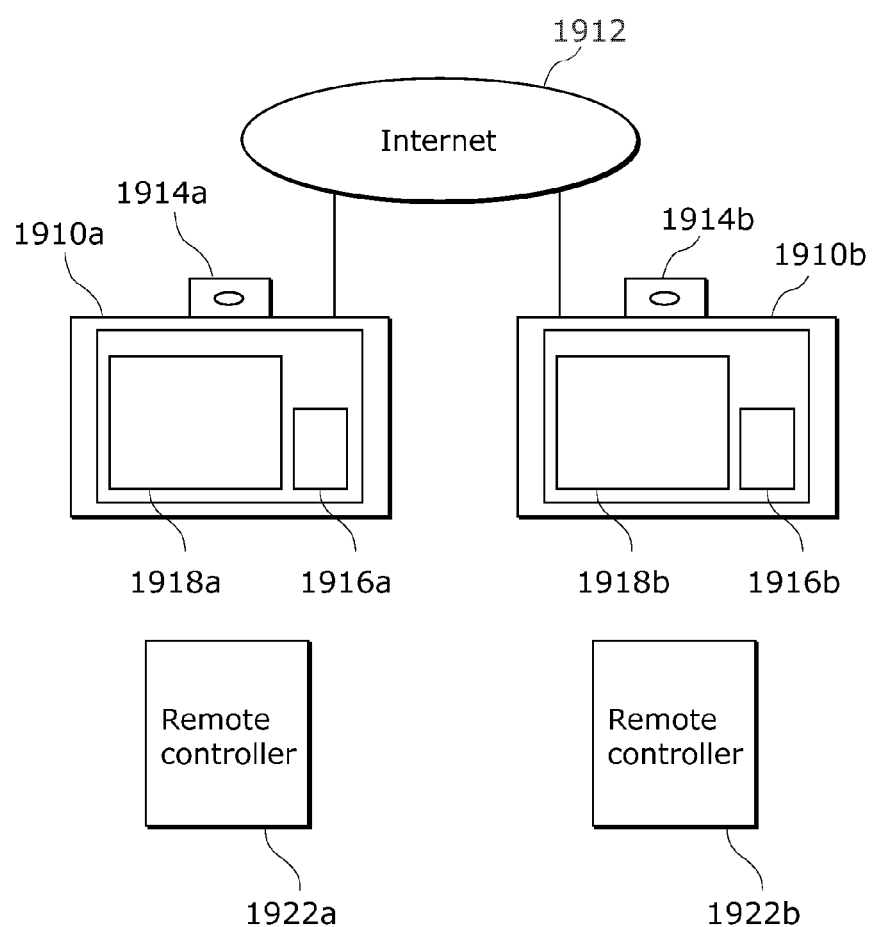
FIG. 15 is a system configuration diagram of a conventional program selecting device.

Next, with reference to FIG. 12 to FIG. 14, descriptions are given of operations by television receivers 100A and 100B according to Embodiment 2. Here, the television receivers 100A and 100B according to Embodiment 2 are common in structure to those in Embodiment 1 shown in FIG. 1A to FIG. 5, and are not described again. In addition, operations common between Embodiments 1 and 2 are not described in detail, and differences are mainly described.

Embodiment 2 describes an example where the television receiver 100E remotely operates the television receiver 100A, FIG. 12 is a flowchart showing operations by the television receiver 100A subject to a remote operation (the operated side). FIG. 13 is a flowchart showing operations by the television receiver 100B which performs a remote operation (the operating side), FIG. 14 is a diagram showing display examples of the monitors 107A and 107B of the television receivers 100A and 100B.

First, when the user of the television receiver 100A selects the "Function setting screen" of the fourth display area 604A, the television receiver 100A transmits, as the shared information, the image data of the function setting screen of the own apparatus to the television receiver 100B (S301 in FIG. 12). In addition, the television receiver 100A displays the function setting screen in the third display area 603A of the monitor 107A. On the other hand, the television receiver 100B displays the image data of the function setting screen received from the television receiver 100A in the third display area 603B on the monitor 107B (S401 of FIG. 13).

In this way, as shown in the display example at the upper row in FIG. 14, a menu for setting a function of the television receiver 100A (the menu includes "Channel assignment", "Network setting", and "Luminance adjustment" in the example of FIG. 14) is displayed in the third display areas 603A and 603B of the monitors 107A and 107B. The processing up to this point is common to the processing in Embodiment 1, and thus the same description is not provided here.

Next, the television receiver 100B starts reception of a command input from the user (S402). More specifically, when the user of the television receiver 100B selects "Remote operation" in the fourth display area 604B using a remote controller or the like, the third display area 603B is focused (by being enclosed by a bold frame in the example of FIG. 14) as shown in the upper right display example in FIG. 14. In this way, a remote operation performed by the user of the television receiver 100B is not reflected on the television receiver 100B itself but is converted to a command by the command generation program 412 so that the operation is reflected on the shared information displayed in the third display area 603B.

For example, when the user of the television receiver 100B executes an operation for selecting "Luminance adjustment" from the menu displayed in the third display area 603B (YES in S402), the command generation program 412 of the television receiver 100B generates data in which an identifier (10.10.2.5) for identifying the television receiver 100B, an identifier (10.1.9.16) for identifying the television receiver 100A, "5" which is a data type of a command for selecting "Luminance adjustment", and the command are set at the SOURCE 702, the DST 703, the TYPE 704, and the PAYLOAD 705, respectively in FIG. 11. The command transmission program 411 transmits the data generated by the command generation program 412 to the television receiver 100A through the network transmission program 403 (S403).

On the other hand, when the command reception program 409 of the television receiver 100A receives the data including the command from the television receiver 100B through the network reception program 402 (YES in S302), the command reception program 409 passes the command for selecting "Luminance adjustment" included in the received data to the command execution program 410. The command execution program 410 executes the command for selecting "Luminance adjustment" obtained for the function setting screen of the television receiver 100A (S303), and passes the execution result to the overall control program 401.

The overall control program 401 transmits image data of the "Luminance adjustment screen (that is, the shared information after the execution of the command)" as the result of executing the command on the function setting screen to the television receiver 100E through the command generation program 412, the command transmission program 411, and the network transmission program 403 (S304). In addition, the overall control program 401 displays the "Luminance adjustment screen" that is the shared information in the third display area 603A on the monitor 107A through the display control program 406.

The overall control program 401 of the television receiver 100B receives the image data of the "Luminance adjustment screen" that is the shared information from the television receiver 100A through the network reception program 402, the command reception program 409, and the command execution program 410 (S404), and displays the image data in the third display area 603B on the monitor 107B through the display control program 406. Examples of display on the monitors 107A and 107B at this time are shown in the lower row in FIG. 14.

In this way, the screen image ("Function setting screen" in the above example) that is a remote operation target is transmitted as shared information from the television receiver 100A to the television receiver 100B, the command (for selecting "Luminance adjustment" in the above example) indicating the details of the processing that should be executed on the screen is transmitted from the television receiver 100B to the television receiver 100A, the command is executed by the television receiver 100A, and the screen image (the "Luminance adjustment screen" in the above example) as the result of the execution of the command is transmitted from the television receiver 100A to the television receiver 100B as the shared information. By repeating these processes, the television receiver 100E can remotely operate the television receiver 100A.

Other Embodiments

It should be noted that, although the present invention has been described based on aforementioned embodiments, the present invention is obviously not limited to such embodiments. The following cases are also included in the present invention.

Each of the aforementioned apparatuses is, specifically, a computer system including a microprocessor, a ROM, a RAM, a hard disk unit, a display unit, a keyboard, a mouse, and so on. A computer program is stored in the RAM or hard disk unit. The respective apparatuses achieve their functions through the microprocessor's operations according to the computer program. Here, in order to achieve certain functions, the computer program is configured by combining plural instruction codes indicating instructions for the computer.

A part or all of the structural elements of the respective apparatuses may be configured with a single system-LSI (Large-Scale Integration). The system-LSI is a super-multi-function LSI manufactured by integrating structural units on a single chip, and is specifically a computer system configured to include a microprocessor, a ROM, a RAM, and so on. A computer program is stored in the RAM. The respective apparatuses achieve their functions through the microprocessor's operations according to the computer program.

A part or all of the structural elements constituting the respective apparatuses may be configured as an IC card which can be attached to and detached from the respective apparatuses or as a stand-alone module. The IC card or the module is a computer system configured from a microprocessor, a ROM, a RAM, and so on. The IC card or the module may also be included in the aforementioned super-mufti-function LSI. The IC card or the module achieves its functions through the microprocessor's operations according to the computer program. The IC card or the module may also be implemented to be tamper-resistant.

The present invention may be implemented as the above-described method. Furthermore, the present invention may be implemented as computer programs for executing the above-described method, using a computer, and may also be implemented as digital signals including the computer programs.

Furthermore, the present invention may also be implemented as computer programs or digital signals recorded on computer-readable recording media such as a flexible disc, a hard disk, a CD-ROM, an MO, a DVD, a DVD-ROM, a DVD-RAM, a BD (Blu-ray Disc), and a semiconductor memory. Furthermore, the present invention may also be implemented as the digital signals recorded on these recording media.

Furthermore, the present invention may also be implemented as the aforementioned computer programs or digital signals transmitted via a telecommunication line, a wireless or wired communication line, a network represented by the Internet, a data broadcast, and so on.

The present invention may also be implemented as a computer system including a microprocessor and a memory, in which the memory stores the aforementioned computer program and the microprocessor operates according to the computer program.

Furthermore, it is also possible to execute another independent computer system by transmitting the programs or the digital signals recorded on the aforementioned recording media, or by transmitting the programs or digital signals via the aforementioned network and the like.

The above-described embodiments and variations may be combined.

Although the embodiments of the present invention have been described above with reference to the drawings, the present invention is not limited to the illustrated embodiments. To the illustrated embodiments, it is possible to make various kinds of modifications and variations within the same scope of the present invention or within an equivalent range.

INDUSTRIAL APPLICABILITY

The television receiving apparatus according to the present invention is mainly used for digital television receivers, but is also used for DVD/BD players, mobile phones, etc.

REFERENCE SIGNS LIST 10, 1912 Internet
11 Casing
12 Display unit
13 Front panel
14 Input terminal
15 Network input terminal
16, 1922a, 1922b Remote controller
100, 100A, 100B, 1000, 1910a, 1910b Television receiver
101 Input unit
102 First memory
103 Second memory
104 Receiving unit
105 Reproducing unit
106 Speaker
107, 107A, 107B Monitor
108 Microphone
109 Camera
110 Network unit
111 CPU
300 Program
301 OS
301a Kernel
301b OS library
302 Control program
303 TV reproduction program
304 Videophone program
305 IPTV application execution program
401 Overall control program
402 Network reception program
403 Network transmission program
404 Videophone core program
405 Input reception program
406 Display control program
407 Broadcast reception program
408 Data extraction program
409 Command reception program
410 Command execution program
411 Command transmission program
412 Command generation program
413 TV reproduction control program
501 Telephone book program
502 Videophone connection program
503 Video reproduction program
504 Audio reproduction program
505 Camera control program
506 Microphone control program
507 Demultiplex program
508 Multiplex program
601A, 601B First display area
602A, 602B Second display area
603A, 603B Third display area
604A, 604B Fourth display area
1914a, 1914b Video camera
1916a, 1916b Sub-screen
1918a, 1918b Viewing screen

The invention claimed is:

1. A television receiving apparatus which transmits and receives video information and audio information to and from a peer apparatus connected via a communication network, the television receiving apparatus comprising:
   a transmitting unit configured to transmit, to the peer apparatus, first audio information received by a microphone connected to the television receiving apparatus and first video information captured by a camera connected to the television receiving apparatus;

a receiving unit configured to receive, from the peer apparatus, second audio information received by a microphone connected to the peer apparatus, second video information captured by a camera connected to the peer apparatus, and a command indicating details of processing that should be executed on shared information;

a telephone control unit configured to output the second audio information to a speaker connected to the television receiving apparatus;

a display unit segmented into a first display area in which the first video information is displayed, a second display area in which the second video information is displayed, and a third display area;

a shared information control unit configured to cause shared information selected by a user of the television receiving apparatus to be displayed in the third display area, and cause the transmitting unit to transmit the shared information so that the shared information is displayed by the peer apparatus; and a command executing unit configured to execute the processing indicated by the command on the shared information, wherein the shared information control unit is further configured to cause the shared information subjected to the processing to be displayed in the third display area, and cause the transmitting unit to transmit the shared information so that the shared information is displayed by the peer apparatus, the processing being indicated by the command and executed by the command executing unit.

2. The television receiving apparatus according to claim 1, wherein the receiving unit is further configured to receive, from the peer apparatus, compatibility information indicating a format of the shared information which can be displayed, and the shared information control unit is configured to allow the user to select only the shared information having the format indicated by the compatibility information.

3. The television receiving apparatus according to claim 1, further comprising:

a tuner which receives a television program and electronic program information through a broadcast wave; and a shared information extracting unit configured to extract shared information candidates which are candidates for the shared information from the television program and the electronic program information received by the tuner, wherein the shared information control unit is configured to allow the user to select the shared information from among the shared information candidates extracted by the shared information extracting unit.

4. The television receiving apparatus according to claim 1, wherein the shared information is location information indicating a location of actual data that should be displayed, and the shared information control unit is configured to cause the actual data obtained at the location indicated by the location information to be displayed in the third display area, and cause the transmitting unit to transmit the location information so that the actual data is displayed by the peer apparatus.

5. The television receiving apparatus according to claim 4, wherein the location information is either channel information indicating a source of a television program or a Uniform Resource Locator (URL) indicating the location on the Internet.

6. The television receiving apparatus according to claim 1, wherein the receiving unit is further configured to receive, from the peer apparatus, shared information displayed by the peer apparatus, and the shared information control unit is further configured to cause the shared information received by the receiving unit to be displayed in the third display area.

7. A television receiving apparatus which transmits and receives video information and audio information to and from a peer apparatus connected via a communication network, the television receiving apparatus comprising:

a transmitting unit configured to transmit, to the peer apparatus, first audio information received by a microphone connected to the television receiving apparatus and first video information captured by a camera connected to the television receiving apparatus;

a receiving unit configured to receive, from the peer apparatus, second audio information received by a microphone connected to the peer apparatus, second video information captured by a camera connected to the peer apparatus, and shared information displayed by the peer apparatus;

a telephone control unit configured to output the second audio information to a speaker connected to the television receiving apparatus;

a display unit segmented into a first display area in which the first video information is displayed, a second display area in which the second video information is displayed, and a third display area in which the shared information is displayed; and a command generating unit configured to generate a command indicating details of processing that should be executed on the shared information displayed in the third display area, wherein the transmitting unit is further configured to transmit, to the peer apparatus, the command generated by the command generating unit, the receiving unit is further configured to receive, from the peer apparatus, the shared information subjected to the processing indicated by the command transmitted from the transmitting unit, and the display unit is further configured to display, in the third display area, the shared information subjected to the processing indicated by the command.

8. A method of controlling a television receiving apparatus which transmits and receives video information and audio information to and from a peer apparatus connected via a communication network, the method comprising:

transmitting, to the peer apparatus, first audio information received by a microphone connected to the television receiving apparatus and first video information captured by a camera connected to the television receiving apparatus;

receiving, from the peer apparatus, second audio information received by a microphone connected to the peer apparatus, second video information captured by a camera connected to the peer apparatus, and a command indicating details of processing that should be executed on shared information;

outputting the second audio information to a speaker connected to the television receiving apparatus;

segmenting a display unit into a first display area in which the first video information is displayed, a second display area in which the second video information is displayed, and a third display area;

causing, in the segmenting, shared information selected by a user of the television receiving apparatus to be displayed in the third display area, and causing the shared information to be transmitted in the transmitting so that the shared information is displayed by the peer apparatus; and executing the processing indicated by the command on the shared information, wherein, in the causing, the shared information subjected to the processing is further caused to be displayed in the third display area, and to be transmitted in the transmitting so that the shared information is displayed by the peer apparatus, the processing being indicated by the command and executed in the executing.

9. A method of controlling a television receiving apparatus which transmits and receives video information and audio information to and from a peer apparatus connected via a communication network, the method comprising:

transmitting, to the peer apparatus, first audio information received by a microphone connected to the television receiving apparatus and first video information captured by a camera connected to the television receiving apparatus;

receiving, from the peer apparatus, second audio information received by a microphone connected to the peer apparatus, second video information captured by a camera connected to the peer apparatus, and shared information displayed by the peer apparatus;

outputting the second audio information to a speaker connected to the television receiving apparatus;

segmenting a display unit into a first display area in which the first video information is displayed, a second display area in which the second video information is displayed, and a third display area in which the shared information is displayed; and generating a command indicating details of processing that should be executed on the shared information displayed in the third display area, wherein in the transmitting, the command generated in the generating is further transmitted to the peer apparatus, in the receiving, the shared information subjected to the processing indicated by the command transmitted in the transmitting is further received from the peer apparatus, and in the segmenting, the shared information subjected to the processing indicated by the command is further displayed in the third display area.

* * * * *